United States Patent
Chen

(10) Patent No.: US 8,355,055 B2
(45) Date of Patent: Jan. 15, 2013

(54) METHOD FOR REAL-TIME ADJUSTING IMAGE CAPTURE FREQUENCY BY IMAGE DETECTION APPARATUS

(75) Inventor: Jau-Yu Chen, Taipei (TW)

(73) Assignee: Lite-On Semiconductor Corp., Taipei Hsien (TW)

( * ) Notice: Subject to any disclaimer, the term of this patent is extended or adjusted under 35 U.S.C. 154(b) by 222 days.

(21) Appl. No.: 12/715,593

(22) Filed: Mar. 2, 2010

(65) Prior Publication Data

US 2011/0157459 A1 Jun. 30, 2011

(30) Foreign Application Priority Data

Dec. 31, 2009 (CN) .......................... 2009 1 0216916

(51) Int. Cl.
*H04N 5/228* (2006.01)
*H04N 5/235* (2006.01)
*H04N 5/222* (2006.01)
*G03B 7/00* (2006.01)

(52) U.S. Cl. ............. 348/222.1; 348/208.99; 348/208.3; 348/208.6; 348/229.1; 348/230.1; 348/333.01; 348/333.11; 348/362

(58) Field of Classification Search ............. 348/207.99, 348/208.99–208.1, 208.3–208.6, 208.12–208.16, 348/222.1, 229.1–230.1, 239–241, 294–298, 348/333.01–333.05, 333.11–333.12, 362–366, 348/367

See application file for complete search history.

(56) References Cited

U.S. PATENT DOCUMENTS

| | | | |
|---|---|---|---|
| 7,030,911 B1 * | 4/2006 | Kubo ......................... | 348/221.1 |
| 7,162,151 B2 * | 1/2007 | Nonaka et al. .................. | 396/52 |
| 7,844,121 B2 * | 11/2010 | Iizuka et al. ................... | 382/236 |
| 7,940,308 B2 * | 5/2011 | Suzuki et al. ............... | 348/222.1 |
| 7,986,343 B2 * | 7/2011 | Kumagai et al. ......... | 348/208.13 |
| 2002/0149693 A1 * | 10/2002 | Tantalo et al. ................ | 348/362 |
| 2005/0052553 A1 * | 3/2005 | Kido et al. .................... | 348/296 |
| 2007/0115364 A1 * | 5/2007 | Kumaki ................... | 348/208.99 |
| 2009/0103630 A1 * | 4/2009 | Fuchikami et al. ...... | 375/240.25 |
| 2009/0322896 A1 * | 12/2009 | Yoshizumi ................ | 348/222.1 |
| 2010/0020196 A1 * | 1/2010 | Suzuki et al. .............. | 348/231.7 |

* cited by examiner

*Primary Examiner* — Jason Chan
*Assistant Examiner* — Michael Osinski
(74) *Attorney, Agent, or Firm* — Rosenberg, Klein & Lee

(57) ABSTRACT

A method for real-time adjusting image capture frequency by an image detection apparatus comprises: sensing the frames consecutively by an image detection unit; setting a value for a counting variable; selecting a testing frame from the frames and comparing an image displacement between the testing frame and a previous frame thereof, to obtain a motion reference signal by a processing unit; providing a plurality of adjustable values for a capturing frequency variable by a memory unit and corresponding either one of the capturing frequency variable values to the motion reference signal; comparing the value of the counting variable to that of the capturing frequency variable by the processing unit; capturing and recording the testing frame as a sampling frame while the counting variable value reaches that of the capturing frequency variable; comparing an image displacement between the sampling frame and a previous frame thereof, to obtain an ultimate motion speed.

10 Claims, 5 Drawing Sheets

METHOD FOR REAL-TIME ADJUSTING IMAGE CAPTURE FREQUENCY BY IMAGE DETECTION APPARATUS

BACKGROUND OF THE INVENTION

1. Field of the Invention

The present invention relates to a method for adjusting image capture frequency, in particular, to an real-time adjusting image capture frequency method associated with an image detection apparatus.

2. Description of Related Art

While an image detection apparatus is capturing motion image frames, if a captured object or the image detection apparatus itself is in a motion mode, the image detection apparatus must increase or decrease the image capture frequency associated with a movement speed so as to prevent the motion image frames of the object in motion appears jump not continuous transition of the image as the object or the apparatus moves too fast and the image capture frequency is too low (the time interval between the images in accordance with the captured object is too long); or as the image capture frequency is far higher than the movement speed, the computation burden for the image detection apparatus processing the image frames increases.

So far, most conventional image detection apparatuses have abilities to detect images or analyze motion speeds. Thus, in a known method for adjusting the frequency of image acquisition, an image detection unit, processing unit, or other hardware components, etc., of the image detection apparatus is applied to increase or decrease the time interval between the image frames detected by the image detection unit each time in response to the motion speed analyzed. In other words, to increase or decrease the detected image frames, it can be achieved by means of controlling the image detection unit to adjust a number of detecting image frames per second. As the motion speed increases, the number of image frames which required to be detected by the image detection unit raises; conversely, as the motion speed decreases, the number of image frames which required to be detected by the image detection unit reduces.

SUMMARY OF THE INVENTION

In view of the aforementioned issues, the present invention provides a method for real-time adjusting image capture frequency by an image detection apparatus, for capturing frames contained inside images accurately in response to the motion speed of the image detection apparatus simultaneously.

To achieve the aforementioned objectives, an embodiment of a method for real-time adjusting image capture frequency by an image detection apparatus according to the present invention is provided. The image detection apparatus comprises an image detection unit, a processing unit, and a memory unit. The steps of the method includes: first, detecting the frames consecutively by an image detection unit; setting a value for a counting variable; selecting a testing frame from the frames and comparing an image displacement between the testing frame and a previous frame thereof, so as to obtain a motion reference signal in accordance with the image detection apparatus in the testing frame by a processing unit; providing a plurality of adjustable values for a capturing frequency variable by a memory unit and matching either one adjustable values of the capturing frequency variable with the motion reference signal; comparing the value of the counting variable to that of the capturing frequency variable corresponding with the motion reference signal by the processing unit; capturing and recording the testing frame as a sampling frame while the value of counting variable reaches that of the capturing frequency variable; and comparing an image displacement between the sampling frame and a previous frame thereof, to obtain an ultimate motion speed of the sampling frame.

Therefore through the aforementioned technical proposal of the present invention, the following efficacy is achieved: the image detection apparatus can automatically adjust the speed of image acquisition with respect to the movement speed of the apparatus by the image detection unit, thereby maintaining the efficiency of capturing images and reducing the computation burden of the processing unit. In order to further understand the techniques, means and effects the present invention takes for achieving the prescribed objectives, the following detailed description and included drawings are hereby referred, such that, through which, the purposes, features and aspects of the present invention can be thoroughly and concretely appreciated; however, the included drawings are provided solely for reference and illustration, without any intention to be used for limiting the present invention, whose full scope and dimension is described only in the later following claims.

DETAILED DESCRIPTION OF THE PREFERRED EMBODIMENTS

As per the aforementioned technical proposals according to the present invention, a method for real-time adjusting image capture frequency is provided by computing a movement speed of an image detection apparatus, then modifying an interval value between frames captured by the image detection apparatus in response to the movement speed, and selecting the frames which are applied for processing image comparison in response to the frame interval value, so that the image detection apparatus can change the image capture frequency with respect to the difference of motion speed in a fixed frame rate.

Figure 1:
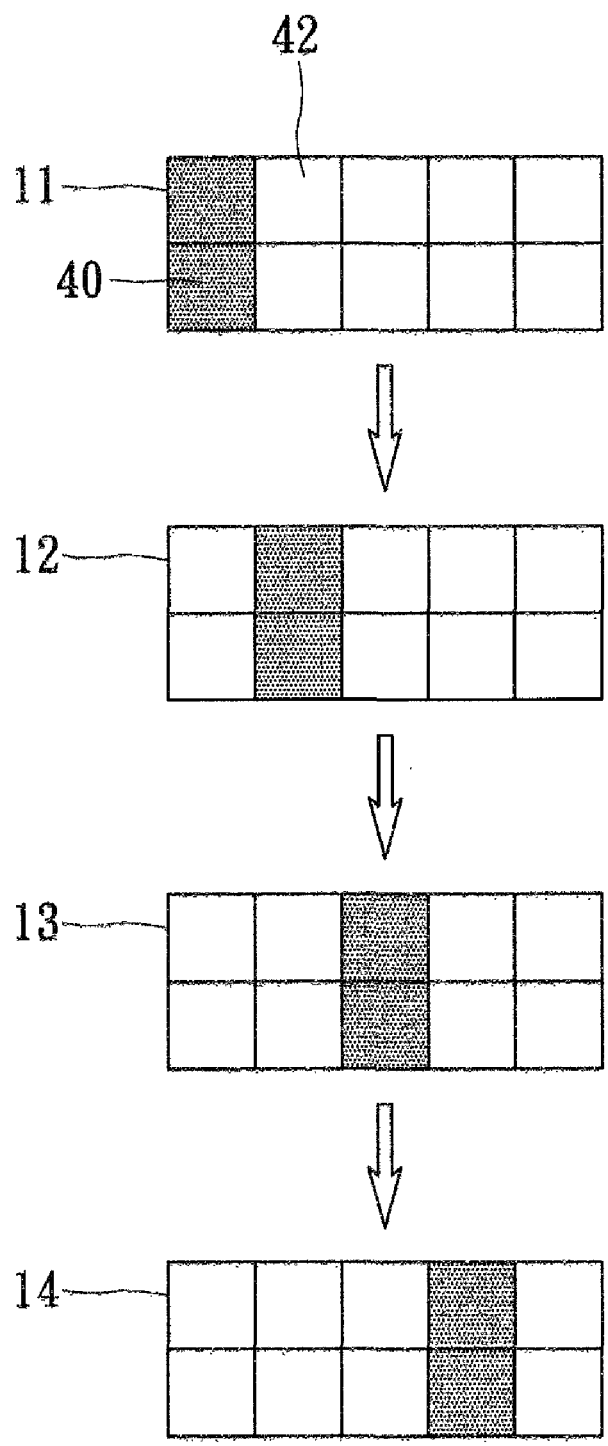
FIG. 1 illustrates a schematic diagram of a first embodiment of an image detection apparatus sensing a plurality of frames.

First please refer to FIG. 1, in which a schematic diagram of a first embodiment of an image detection apparatus sensing a plurality of frames 11, 12, 13, and 14 in time sequence is demonstrated. Each frame is composed by a plurality of pixels 42 for recording a position of an image 40. The image detection apparatus moves in a fixed frame rate and the position of the image 40 is different in the frame 11 to 14, thereby resulting in an image displacement. The frame 11 and the frame 12 are taken as an example for illustration. The position of the image 40 is located at the first column of pixels of the detected frame 11. The position of the image 40 is located at the second column of pixels of the frame 12. In other words, the position of the image 40 shifts one column from frame 11 to frame 12. As the image detection apparatus detects the frame 13 and the frame 14, the image 40 further shifts one column of pixels respectively. In views of the displacement of the image 40, the image 40 moves in a speed of a pixel each time. As a result, under the premise of knowing the frame rate and the distance between each frame, the movement speed of the image detection apparatus can be calculated.

Figure 2:
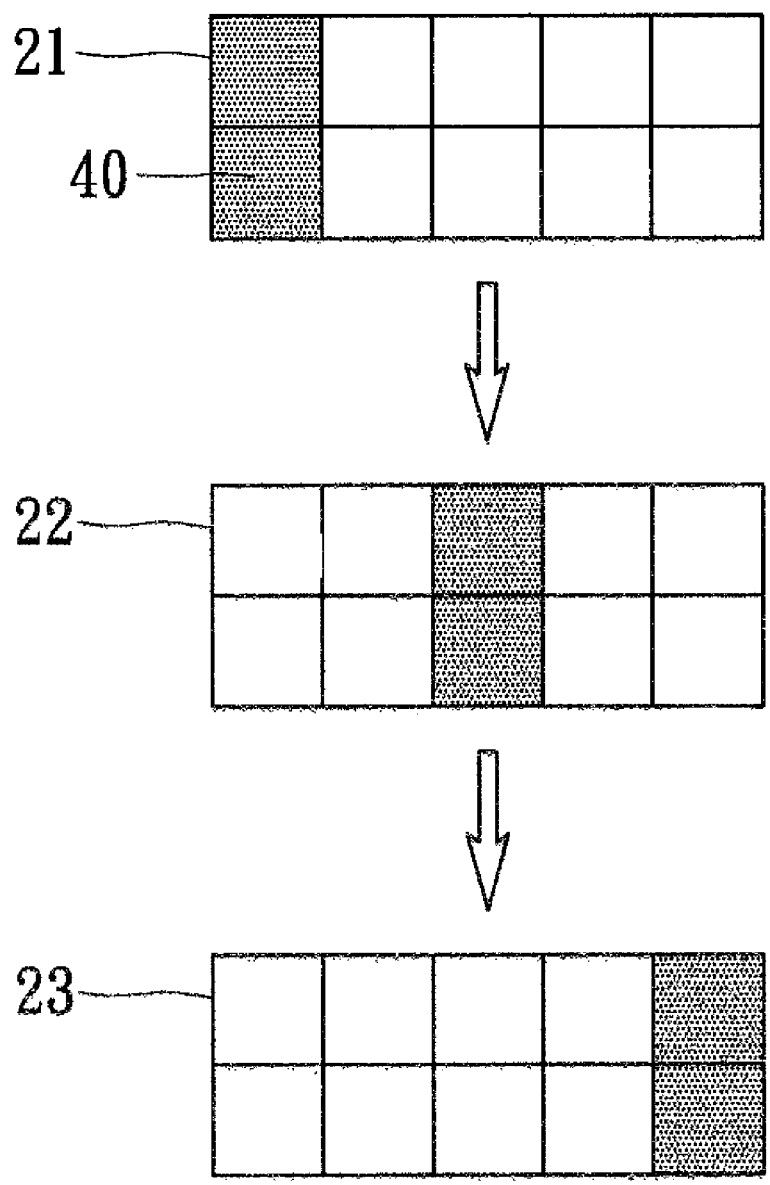
FIG. 2 illustrates a schematic diagram of a second embodiment of an image detection apparatus sensing a plurality of frames.

Next please refer to FIG. 2, in which a schematic diagram of a second embodiment of an image detection apparatus sensing a plurality of frames 21, 22 and 23 in order is demonstrated. The displacement amount of the image 40 is by shifting toward right 2 pixels per each frame. If the frame rate of the frames 21 to 23 shown in FIG. 2 is exactly the same as that of the frames 11 to 14 in FIG. 1, it represents the movement speed of the image detection apparatus in the FIG. 2 is faster than that of the image detection apparatus in the FIG. 1. The faster movement speed of the image detection apparatus is; the larger image displacement of each frame is. As such, if the frequency of image acquisition doesn't increase accordingly for allowing the image detection apparatus to compute the movement speed so as to generate a corresponding frame rate, discontinuous transition of the image occurs easily. In order to prevent the above-mentioned issues, it is supposed to reduce the time interval of the detected frames each time, thereby increasing the frame capture frequency.

Figure 3:
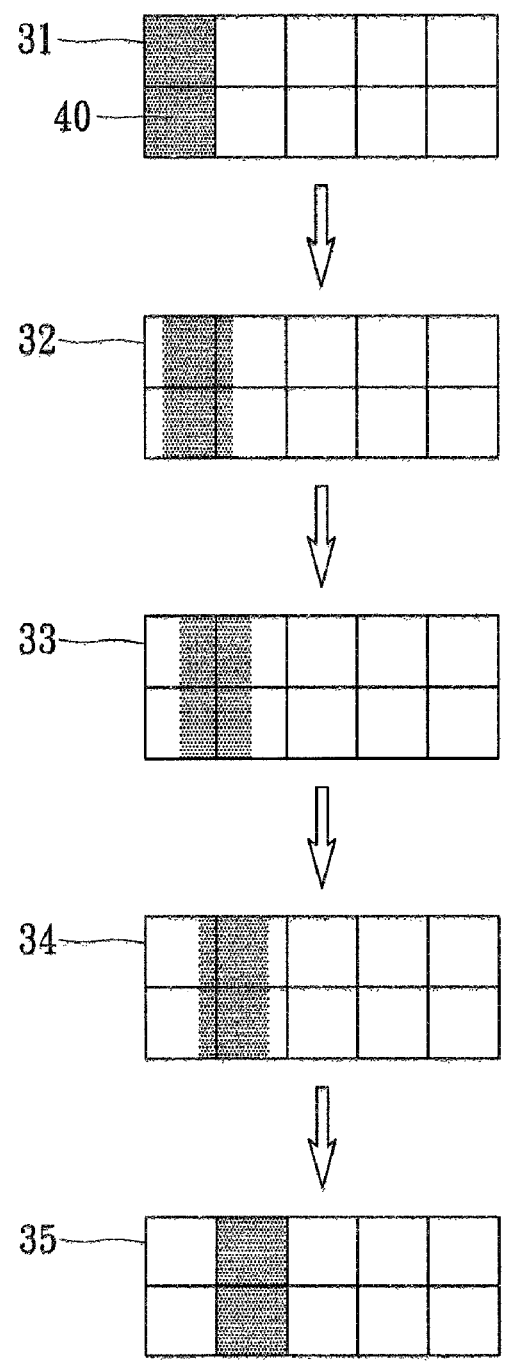
FIG. 3 illustrates a schematic diagram of a third embodiment of an image detection apparatus sensing a plurality of frames.

Yet, refer to FIG. 3, in which a schematic diagram of a third embodiment of an image detection apparatus sensing a plurality of frames 31, 32, 33, 34, and 35 in order with respect to the frame rate of FIG. 1 is demonstrated. In the frames 31 to 35, the position of the image 40 starts from the first pixel on the most left side of the frame 31 and shift right to the second pixel up till the frame 35. Thus, the movement speed of the image 40 is slower than that of the image 40 shown in FIG. 1 and FIG. 2. Under the circumstance, it is necessary to reduce the frequency of detecting frames, i.e. increase the time interval between two detected frames, thereby reducing the computation burden and the detecting frames by the image detection apparatus.

Figure 4:
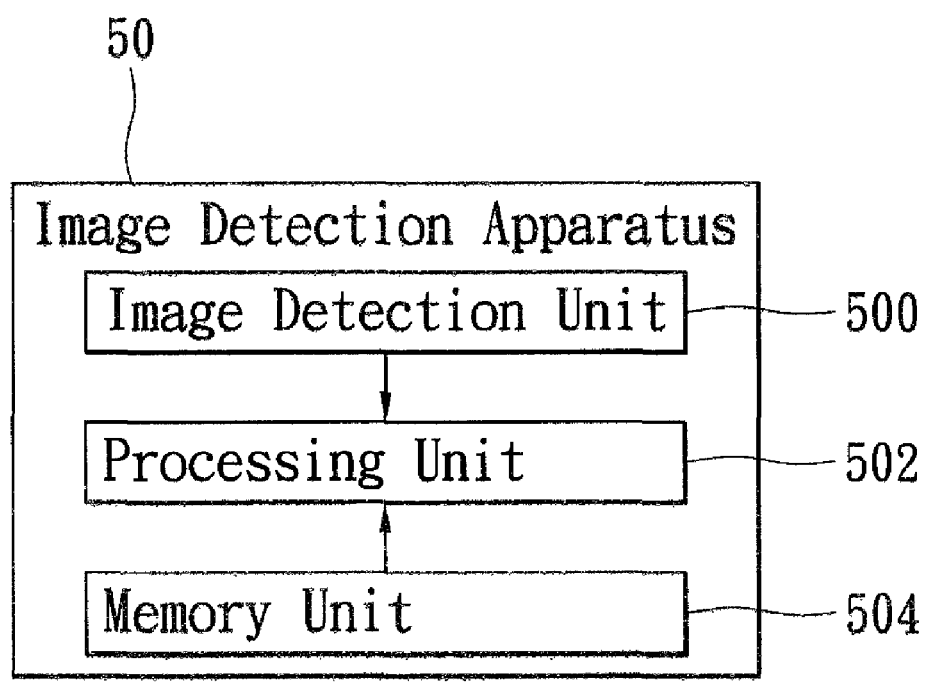
FIG. 4 illustrates a block diagram of an embodiment in accordance with the image detection apparatus for adjusting image capture frequency on time according to the present invention.

Next please refer to FIG. 4, in which a block diagram of an embodiment in accordance with the image detection apparatus for adjusting image capture frequency on time according to the present invention is demonstrated. The aforementioned image detection apparatus 50 at least includes an image detection unit 500, a processing unit 502, and a memory unit 504. The image detection apparatus 50 further includes other components in conjunction with the aforementioned units for operating, e.g. an analog digital converter or a display unit, etc., but in the embodiment, the components merely related to adjusting image capture frequency are further illustrated.

The image detection unit 500. e.g. a surface detector or a plurality of sequence detectors arranged in parallel, sensing and receiving a plurality of frames consecutively in response to a frame rate and each frame has a plurality of pixels for recording a captured image. The processing unit 502 is a micro controller, an integrated chip, or a digital signal processor, for determining a motion reference signal of an object or the image detection apparatus 50 by analyzing the variation of pixel positions of the image in the plurality of frames. The motion reference signal is associated with a motional direction and a motion speed. The processing unit 502 selects a suitable value for the capturing frequency variable in response to the variation of motion speed, so that a certain portion frames is selected from the plurality of frames consecutively with respect to the adjustable value of the capturing frequency variable as the setting of the frame rate is not required to be altered, thereby adjusting image capture frequency on time. The aforementioned adjustable value of the capturing frequency variable is the frame interval value between two frames captured by the processing unit 502. Herein, the value of the motion reference signal is in negative proportion to that of the capturing frequency variable. In other words, the faster the motion speed acquired by the motion reference signal is; the smaller the adjustable value of the capturing frequency variable is. The discontinuous transition of image in motion can be prevented as long as the capture frequency after adjusting is not too low, such that the image displacement between two adjacent frames captured is not too large. The memory unit 504 is used to store a plurality of adjustable values for the capturing frequency variable and a plurality of motion speed ranges adapted for the adjustable values of the capturing frequency variable respectively. After the processing unit 502 receives the motion reference signal, it can read data from the memory unit 504 for choosing the most suitable frame interval value adapted for the motion speed computed now.

To illustrate the preferred embodiment according to the present invention, the adjustable value for the capturing frequency variable versus the motion speed range are described as following: the capturing frequency values of 8, 4, 2, and 1 are corresponding to the motion speed ranges of 0~100, 101~200, 201~300, and above 300 respectively. The aforementioned variable values and motion speed ranges are merely for illustration in the embodiment, but not limited thereto. The values can be set by people skilled in the art with respect to the requirements or experiences in practice.

The motion speed unit is millimeter per second (mails). For example, as the processing unit 502 calculates the motion speed of 250 mm/s for the image detection apparatus 50 with respect to the image displacement, the adjustable value of the capturing frequency variable is 2 correspondingly. Next, the processing unit 502 captures once within each two frames and calculate the image displacement between the frames captured, to obtain an ultimate motion signal, i.e. the motional direction and the motion speed.

Figure 5:
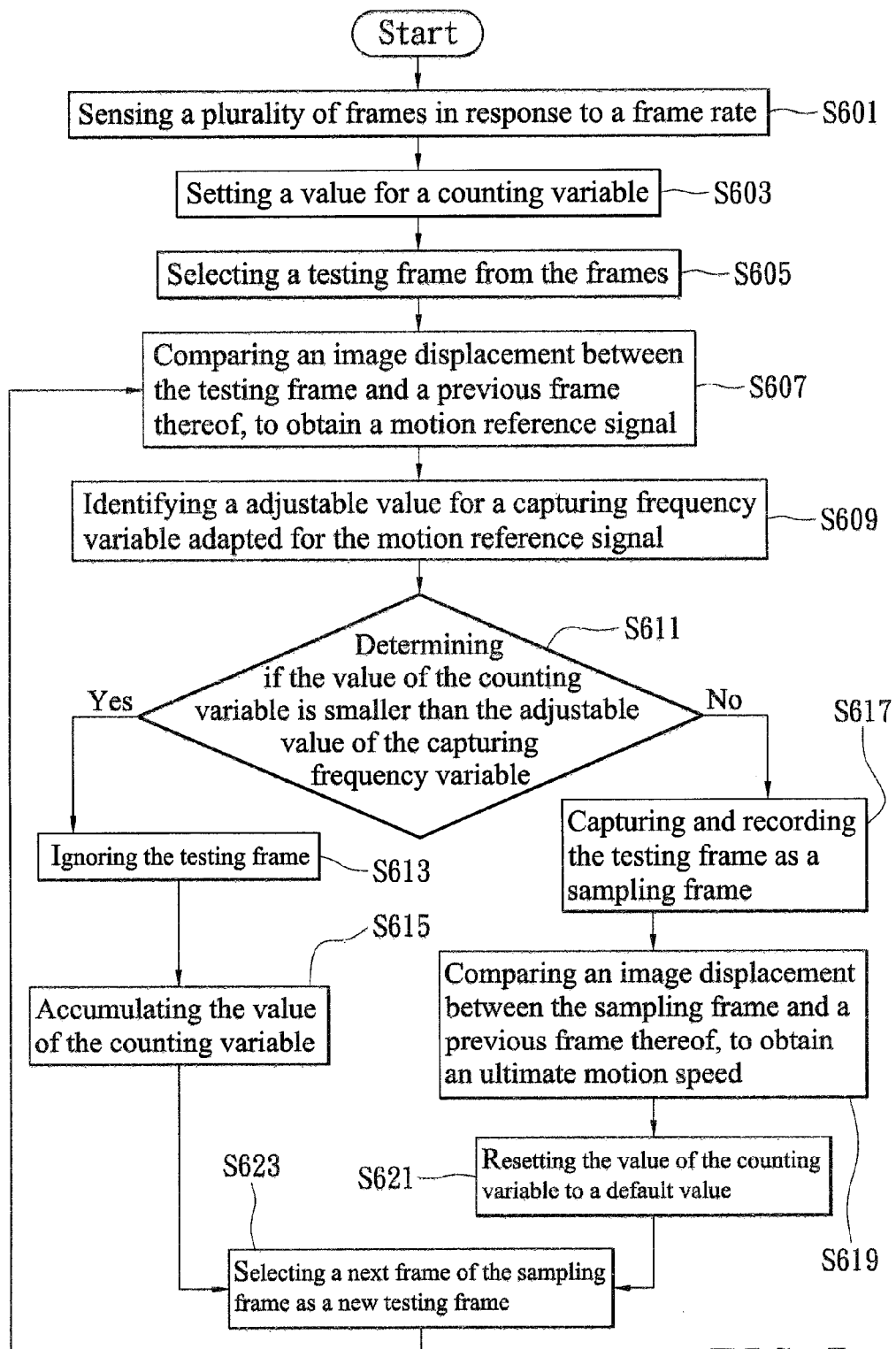
FIG. 5 illustrates a flowchart of the embodiment in accordance with the method for real-time adjusting image capture frequency by the image detection apparatus according to the present invention.

Finally, please refer to FIG. 5 in conjunction with FIG. 4, in which a flowchart of the embodiment in accordance with the method for real-time adjusting image capture frequency by the image detection apparatus according to the present invention is demonstrated. Initially, the image detection unit 500 sets a frame rate and receiving a plurality of frames consecutively in response to the frame rate in step S691. The aforementioned frame rate is a maximum frame rate which can be supported by the image detection apparatus 50, e.g. 20,000 frames per second; and setting a counting variable to a default value while executing the operations of adjusting image capture frequency by the processing unit 502 in step S603.

Subsequently, the processing unit 502 selects either one frame from the plurality of frames as a testing frame to perform executions in step S605, e.g. the second frame $F_2$ of the plurality of frames. Each frame is composed by a plurality of pixels of a detected image. The image position recorded is different in different frames associated with the movement of the image detection apparatus 50. Therefore through comparing the image positions of the testing frame and a reference frame (e.g. the first frame $F_1$ of the plurality of frames) to compute an image displacement with equal distance between each frame, the overall distance of the image displacement between the testing frame and the reference frame. Then, by applying the known frame rate to acquire the passed time between the testing frame and the reference frame, a motion reference signal in the testing frame associated with the image detecting apparatus 50 is computed in step S607. The motion reference signal includes a motional direction and a motion speed of the image detection apparatus 50.

The processing unit 502 may further read the adjustable values for the capturing frequency variable and the corresponding motion speed ranges stored in the memory unit 504, thereby obtaining a suitable value for the capturing frequency variable with respect to the motion reference signal in step S609. For example, if the motion speed contained in the motion reference signal is between 101 mm/s to 200 mm/s, the processing unit 502 chooses the capturing frequency variable value of 4. The above-mentioned capturing frequency variable value a frame interval value, therefore, it also means if the image detection apparatus 50 maintains the motion speed between 101 mm/s to 200 mm/s, the processing unit 502 merely captures a frame out of each four frames as a sampling frame to compute the accurate motion speed. In order to determine if the present testing frame is the sampling frame which is supposed to be captured, it compares the value of the counting variable with the selected value of the capturing frequency variable in step S611. The value of the counting variable represents after capturing a sampling frame previous time, the frame number passed by up till now. In step S11, by comparing the values of the variables, it is easy to determine if the testing frame is supposed to capture a next frame as a sampling frame.

If the comparison result represents the value of the counting variable not exceeding the value of the capturing frequency variable, it neglects the present testing frame without recording in step S613 and uploads the value of the counting variable simultaneously in step S615, e.g. accumulate the value by 1, and then selects a next frame of the testing frame as a new testing frame in step S623 and next returns to step S607 to perform comparison procedures with respect to the reference frame again.

Yet, if the comparison result represents the value of the counting variable exceeding the value of the capturing frequency variable, it records the present testing frame as a sampling frame in step S617, and compares the present sampling frame to the previous frame thereof which is recorded thru the same procedures, and then computes an ultimate motion signal in response to both the passed time and the overall distance of the image displacement between the two sampling frames, i.e. the accurate motion speed of the image detection apparatus 50.

Next, in step S621, resetting the value of the counting variable to a default value and then executing step S607 so as to select a suitable sampling frame in response to the adjustable value for the capturing frequency variable from the following testing frames. Moreover, after sensing the plurality of frames, the image capture frequency starts to adjust from the first frame because there is no reference frame for comparison so far. Therefore, a default frame rate is the maximum frame rate to compute the motion speed of the image detection apparatus, so that the first frame must be the first sampling frame captured.

When the value of the counting variable is equal or larger than the value of the capturing frequency variable, it not only records the present testing frame as the sampling frame, but also resets the counting variable to the default value simultaneously. The objective according to the aforementioned technical proposals is to ensure the processing unit 502 to record the sampling frame with respect to the frame interval number represented by the value of the capturing frequency variable.

The plurality of frames 31 to 35 shown in FIG. 3 are taken for an example, after the image detection unit detects the frames 31 to 35, it first sets the counting variable to a default value of 1. After the first frame 31 is captured as the first sampling frame, the counting variable is reset to the default value of 1. Then, as the second frame 32 is selected as a testing frame to compute a motion reference signal in the frame 32 associated with the image detection apparatus 50, the counting variable of the frame 32 is 1 and a motion speed contained in the motion reference signal in the frame 32 can be computed in response to the image displacement and the known frame rate between the frames 31 and 32 at the same time. For example, is the motion speed computed is 150 mm/s, the value of the capturing frequency variable is of 4. It represents under the motion speed, the processing unit 503 captures a frame out of each four frames to compute the image displacement and motion speed. Furthermore, while comparing the value of the counting variable with that of the capturing frequency variable, it identifies the counting variable is of 1 which is smaller than the capturing frequency variable value of 4 and it represents the frame interval between the frame 32 and the previous sampling frame captured not exceeding 4, thereby neglecting the frame 32 without capturing. As the frame is not captured, the counting variable is not going to be reset to the default value and further uploads it, so that the counting variable accumulates or reduces the value thereof according to the design logic. In the embodiment, the counting variable accumulates by 1 to become a value of 2.

Then, the next frame 33 is selected as a testing frame by performing the similar procedures for the motion reference signal If the computation result of the motion speed is within the same range, a same value for capturing frequency variable is applied. Moreover, the present counting variable value is of 2 which is not equal to or larger than the value of the capturing frequency variable of 4, the frame 33 is neglected without capturing and the counting variable is accumulated to be the value of 3, so far and so fourth.

Under the condition that the adjustable value of the capturing frequency variable is maintained unchanged, as the frame 35 is selected as a testing frame and the counting variable is equal to or larger than the value of the capturing frequency variable, it represents the frame interval between the frame 35 and the previous sampling frame is of 4, so that the frame 35 is captured as a sampling frame so as to execute further comparison with the previous samples frame (the frame 31) to obtain an ultimate motion signal. After the frame 35 is the sampling frame, the counting variable is reset to the default value for operations of next frames after the frame 35.

Additionally, during the adjusting process, for example, in the frame 34, the counting variable value is of 3, but the motion reference signal acquired now computes the motion speed of the image detection apparatus speeding up to 210 mm/s, it is necessary to enhance the image capture frequency correspondingly to maintain the smooth of the image, so that the adjustable value of the capturing frequency variable is changed to the value of 2. Now, the counting variable is larger than the value of the capturing frequency variable. In other words, the processing unit 502 is supposed to capture an image out of each two images as a sampling frame, but actually frame interval value between the frame 34 and the previous sampling frame (the frame 31 in the embodiment) is larger than two frames and without capturing any new sampling frames. As a result, under the circumstance mentioned above, the processing unit 502 will immediately capture the frame 34 as a sampling frame for further executing comparison with the frame 31.

It is worth to mention that the aforementioned counting variable in the embodiment has the default value of 1 merely for illustration, but not limited thereto. In practice, it is common to see that the default value for variables recorded or computed by a processing unit is of 0. Consequently, people in the skilled art may adjust values of the capturing frequency variable accordingly. For example, in the motion speed of 101 mm/s to 200 mm/s, in computation the value of the counting variable is of 3.

In the aspects of the aforementioned embodiments, the proposed method by adjusting capturing frequency of the processing unit out of the images detected by the image detection unit without altering the frame rate which is set by the image detection apparatus, it can still adjust the image capture frequency in response to the speed of the detected image or the image detection apparatus in motion, thereby maintaining continuousness of the image in motion and saving the cost generated in response to the hardware components to switch frame rates.

The aforementioned descriptions represent merely the preferred embodiment of the present invention, without any intention to limit the scope of the present invention thereto. Various equivalent changes, alterations, or modifications based on the claims of present invention are all consequently viewed as being embraced by the scope of the present invention.

What is claimed is:

1. A method for adjusting an image capture frequency in real-time by an image detection apparatus, which includes an image detection unit, a processing unit, and a memory unit, the steps of the method comprising:
   (a) receiving a plurality of frames consecutively;
   (b) setting a value for a counting variable;
   (c) selecting a testing frame from the plurality of frames;
   (d) comparing an image displacement between the testing frame and a frame previous to the testing frame, so as to obtain a motion reference signal associated with the image detection apparatus in the testing frame;
   (e) providing a plurality of adjustable values for a capturing frequency variable, in which either one of the plurality of adjustable values for the capturing frequency variable corresponds to the motion reference signal;
   (f) comparing the value of the counting variable to that of the capturing frequency variable associated with the motion reference signal;
   (g) capturing and recording the testing frame as a sampling frame when the value of the counting variable reaches the adjustable value of the capturing frequency variable; and
   (h) comparing an image displacement between the sampling frame and a previous sampling frame, so as to obtain an ultimate motion speed associated with the image detection apparatus in the sampling frame.

2. The method for adjusting an image capture frequency in real-time by the image detection apparatus according to claim 1, wherein the value of the counting variable represents a frame interval value between the testing frame and the previous sampling frame.

3. The method for adjusting an image capture frequency in real-time by the image detection apparatus according to claim 1, wherein after step (h), the steps of the method further include:
   (i) selecting a next frame after the sampling frame as a new testing frame;
   (j) resetting the value of the counting variable to a default value; and
   (k) re-executing steps (d), (e), and (f).

4. The method for adjusting an image capture frequency in real-time by the image detection apparatus according to claim 3, wherein after step (f), the steps of the method further include:
   (l) ignoring the testing frame when the value of the counting variable does not exceed the adjustable value of the capturing frequency variable.

5. The method for adjusting an image capture frequency in real-time by the image detection apparatus according to claim 4, wherein after step (l), the steps of the method further include:
   (i) selecting a next frame after the testing frame as another new testing frame;
   (m) accumulating the value of the counting variable; and
   (k) re-executing steps (d), (e), and (f).

6. The method for adjusting an image capture frequency in real-time by the image detection apparatus according to claim 2, wherein the step (g), the value of the counting variable reaches the adjustable value of the capturing frequency variable when the value of the counting variable becomes equal to or greater than the adjustable value of the capturing frequency variable.

7. The method for adjusting an image capture frequency in real-time by the image detection apparatus according to claim 1, wherein the adjustable value of the capturing frequency variable is a capture interval value that represents capturing of the testing frame from amongst the plurality of the frames.

8. The method for adjusting an image capture frequency in real-time by the image detection apparatus according to claim 1, wherein the adjustable value of the capturing frequency variable is in positive proportion to the motion reference signal.

9. The method for adjusting an image capture frequency in real-time by the image detection apparatus according to claim 1, wherein each of the adjustable value of the capturing frequency variable correspond to a motion speed amount and the corresponding adjustable value of the capturing frequency variable of the testing frame is determined by the processing unit according to the motion speed amount contained in the motion reference signal.

10. The method for adjusting an image capture frequency in real-time by the image detection apparatus according to claim 1, wherein before step (a), the steps of the method further include:
    setting a frame rate for the image detection apparatus receiving the frames in response to the frame rate;
    wherein the frame rate is a maximum frame rate which is supported by the image detection apparatus.

* * * * *